No. 842,716. PATENTED JAN. 29, 1907.
C. P. SESTER.
SEEDING MACHINE.
APPLICATION FILED JULY 11, 1906.

UNITED STATES PATENT OFFICE.

CHARLES P. SESTER, OF PEORIA, ILLINOIS.

SEEDING-MACHINE.

No. 842,716.  Specification of Letters Patent.  Patented Jan. 29, 1907.

Application filed July 11, 1906. Serial No. 325,561.

*To all whom it may concern:*

Be it known that I, CHARLES P. SESTER, a citizen of the United States, residing at Peoria, in the county of Peoria and State of Illinois, have invented certain new and useful Improvements in Seeding-Machines; and I do hereby declare that the following is a full, clear, and exact description of the invention, which will enable others skilled in the art to which it appertains to make and use the same.

This invention has reference to certain new and useful improvements in seeding-machines, and has particular reference to the general type of broadcast distributers wherein two distributing-fans are employed for receiving and distributing broadcast seed or grain.

The invention has reference and is similar to that type of machine described and illustrated in the application filed by me on September 27, 1905, bearing Serial No. 280,249.

One of the objects of the present invention is the mounting of the driving mechanism and distributing-fans on the outside of the end-gate of a wagon and supporting the main hopper of such seeding devices on the inner side of said end-gate, whereby the main hopper and driving mechanism will counterbalance each other, the hopper and distributing-fans being suitably connected by a feed passing through the end-gate.

A further object of the invention consists of an auger feed passing through the end-gate of a wagon, means for feeding grain or seed to the auger feed at its inner end, a distributer revolubly mounted or disposed beneath the outer end of said feed, and mechanism for actuating said auger feed and distributer.

The invention has for its further object an auger-feed passing through the end-gate of a wagon, a distributer revolubly disposed below the outer end thereof, of means for feeding grain to the inner end of said auger feed, grass-seeding devices mounted on the outside of said end-gate and means for feeding grass-seed therefrom to the outer end of the auger feed, and mechanism for actuating the distributer, auger feed, and grass and grain feeding devices.

The invention has for its further object a pair of parallel-spaced auger feeds passing through the end-gate of a wagon, a hopper-support connected with the inner ends of the auger feed and attached to the inner face of the end-gate, a hopper supported by said hopper-support, a pair of distributers located on the outside of the end-gate and beneath the outer ends of the auger feed, grass-seed devices mounted upon the outside of the end-gate and adapted through intermediate means to convey grass-seed to the outer ends of the auger feed, and driving mechanism also mounted upon the outside of the end-gate, adapted through suitable connections to actuate the auger feed, the distributers, and feeding devices.

For a further and full description of the invention herein and the merit thereof and also to acquire a knowledge of the details of construction of the means for effecting the result reference is had to the following description and drawings hereto attached.

While the essential and characteristic features of the invention are susceptible of modification, still the preferred embodiment of the invention is illustrated in the accompanying drawings, in which:—

Fig. 6 is a plan view of the casings for containing the auger feed, the hopper-support, and component parts, the distributer shown in dotted lines and the driving mechanism for the auger-feed and parts located above the same being omitted; and Fig. 7 is a vertical sectional detail through one of the casings for the auger feed, the feed-way located beneath the outer end of the same and the distributer located therebeneath, and showing the arrangement of the distributing-shaft which has a bearing in a boss formed on the auger-casing.

Like numerals of reference indicate corresponding parts throughout the figures.

In the drawings, 1 designates the usual form of end-gate or tail-board which is adapted to have attached thereto seeding devices and also arranged to be suitably secured to the rear end of a farm-wagon or other suitable vehicle, the farm-wagon adapted to contain grain which is shoveled therefrom by a driver into a suitable receptacle from which it finds its way to the broadcast distributing devices and thence upon the ground.

In the present device I have arranged to carry the main seeding-hopper and inner end of the feeding devices on the inside of the end-gate which will locate the same within the wagon when the end-gate is attached thereto, the distributers, grass-seeding devices, and driving mechanism being located on the outside of the end-gate, and thereby the seeding-machine proper is counterbalanced on opposite sides of the end-gate. This arrangement also has the advantage of locating the distributing devices considerably lower than is usual in machines of this type and places the upper end of the grain-hopper considerably lower than heretofore, and not only places the hopper considerably lower, but also locates the same within the wagon, so that the driver in shoveling the grain therefrom to the hopper is not required to lift it as high as he would if the hopper were located upon the outside of the end-gate and there is less liability of the grain being accidentally thrown onto the ground instead of into the hopper. The grain is shoveled from the wagon into the hopper during the movement of the wagon and should the wagon give a lurch when the driver was lifting a shovelful of grain to the hopper it is very probable and it often happens that a greater portion of the grain will be thrown onto the ground than into the hopper, occasioned by the hopper being located upon the outside of the end-gate and so high into the air, all of which is obviated in the present device.

Extending through the end-gate near to the lower edge thereof and suitably spaced apart are seen two cylindrical casings, (referred to generally as 2,) they being exact duplicates, and they consist of the semicircular sections 3 and 4, which are preferably secured to the end-gate by means of bolts 3ª, which pass through ears 4ª, projecting from and forming part of the sections of the casing, and the opposite ends of the sections are joined through the provision of the ears 5 and 6, which are secured by means of the bolts 7, the ears forming bearings for the outer and inner ends of the shafts 8, adapted to have secured thereto the sleeves 9, provided with the augers 10. The augers are preferably arranged right and left, because of a convenient mode of actuating the same. However, it is understood that they may be both right or left, accomplished through a little different method of driving the auger-shafts, all of which it is believed will be understood.

The auger-casings 2 at their outer ends are provided with the lower discharge-openings 11 and the oppositely-extended flanges 12, to which it is adapted to detachably connect feedways, to be described. The inner ends of the casings 2 are provided with the upper feed-openings 13, by means of which it is adapted to pass grain into the inner ends of the auger-casings and through the agency of the augers specified convey the grain from the inner end of the casing through the board to the outer ends of said casings and discharge the same onto distributing-fans, to be described, revolubly located below the discharge-openings of said casings. The augers preferably extend from the rear inner ends of the casings to the inner ends of the discharge-openings, as shown in Fig. 3.

Figures 1, 2, 3, 5:
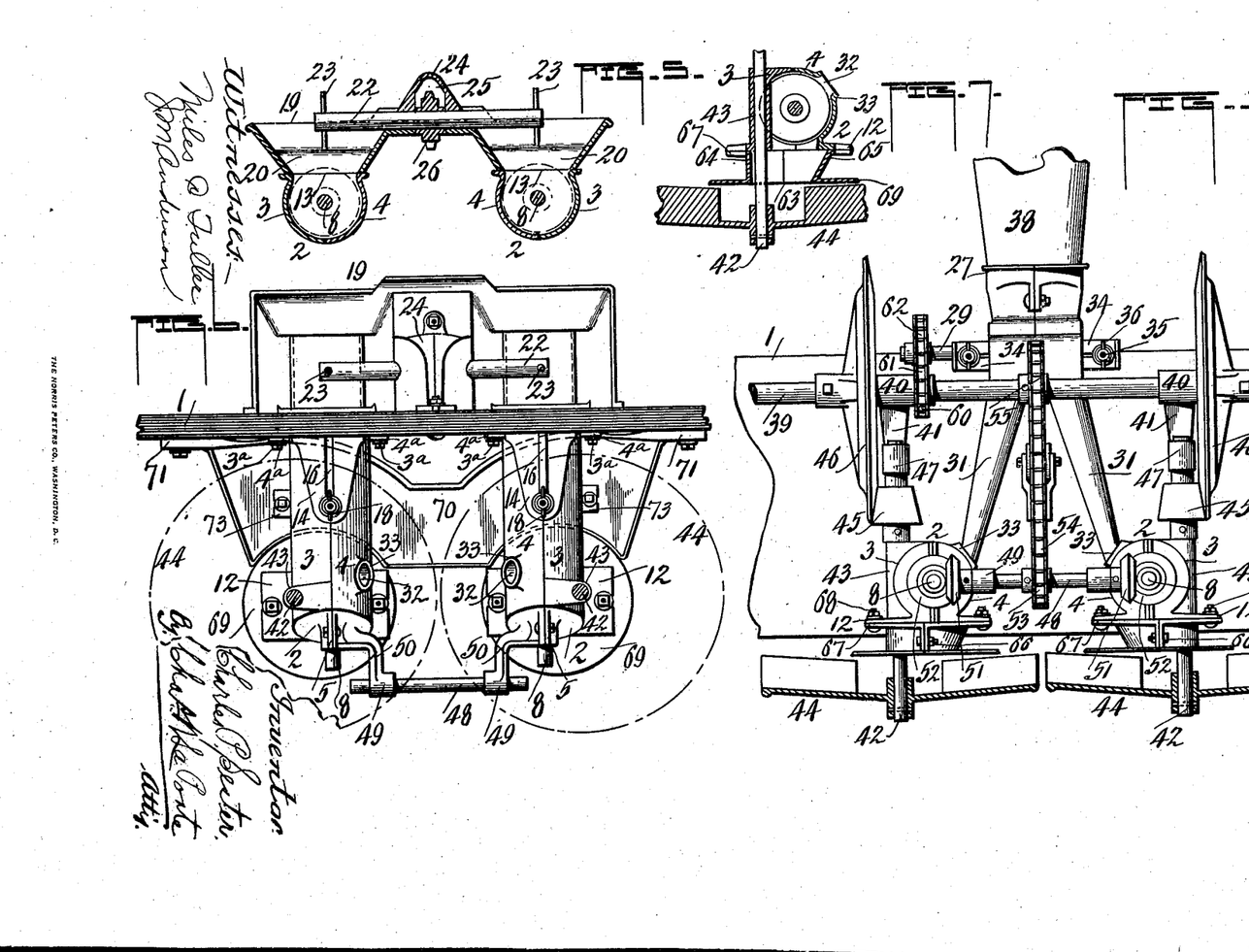
Figure 1 is an elevation of a broadcast distributing-machine containing my improvements, the distributer shown in section and the machine shown attached to an end-gate, the opposite ends of which are broken away.
Fig. 2 is a side view of the machine shown in Fig. 1 with the distributer and end-gate shown in section and part of the grain and grass-seed hoppers broken away.
Fig. 3 is a longitudinal section through one of the auger feeds, also a cross-section of the end-gate and a transverse section of the hopper-support above the inner end of the auger feed.
Fig. 5 is a longitudinal sectional view in elevation of the hopper-support above the inner ends of the auger feed and also showing a cross-section of said auger feed and the casings for containing the same.

Valves for regulating the inlet of feed to the inner ends of the auger-casings through the openings 13 therein are indicated as 14 and are slidably arranged on the upper portions of the casings and through slotted openings 15 in the end-gate, as shown in Fig. 3. The valves 14 are provided with longitudinal slots 16, and through said slots and the wall of the auger-casings are carried bolts 17, which are adapted to be engaged by the winged nuts 18 for securing the valve-plates in adjusted positions, all of which it is believed will be understood.

Secured to the inner face of the end-gate 1 and extending longitudinally thereof and having its opposite ends resting upon and above the inner ends of the auger-casings 2 is a hopper-support 19, provided with feedway portions 20, which overlie the feed-openings 13 of the inner ends of the auger-casings, as shown in Figs. 3, 5, and 6, and extending up and diagonally from the hopper-support is a hopper 21, as shown in Fig. 2. Extending longitudinally of the hopper-support 19, with its opposite ends overlying the central portion of the feedways 20 of the hopper-support and the inner ends of the augers, is an agitating-shaft 22, provided with the agitators 23, as shown in Figs. 3 and 5. This shaft passes through a boxing the lower section of which is formed by the hopper-support and the upper or cap section is detachable from said hopper-support and is indicated as 24. The upper or cap section 24 is adapted to be secured to the inner face of the end-gate and also to the hopper-support and is provided with the chambered portion 25, in which a sprocket-pinion 26 is revolubly carried, which is attached to the agitating-shaft 22. It will thus be seen that upon the placing of the grain into the hopper that if the machine is operated the agitating-shaft through its agitators will keep the grain in constant motion and insure a uniform feed through the hopper-support into the inner ends of the auger-casings, providing the valves have been opened, and the augers receiving the grain will convey the same through the end-gate to the outer ends of the auger-casings, where the grain is discharged onto suitable distributing-fans, the arrangement of the seeding devices being such that before the grain is discharged onto the fans there may be mixed therewith grass or other suitable seed to be distributed with the grain onto the ground.

27 denotes a hopper-support having the cup-shaped portion 28, in which is revolubly arranged a fluted force-feed roller or other suitable feed. This roller or feed has not been shown, for the reason that any suitable feed may be provided, but preferably a fluted feed, which would be similar to the fluted force-feed grass-seeding devices shown in the application above referred to. Such force-feeding devices would be carried on the shaft 29, extending through the cup portion of the hopper-support 27. The grass-seeding attachment is adapted to be secured to the upper outer face of the end-gate 1 through the ears or extended plates 30, as shown in Fig. 2, and connected with the outlet of such grass-seeding attachment are diverging spouts 31, which may be duplicates of each other and formed integral or not at their upper ends, and, if desired, divided by a partition, so as to regulate the feeding of the grain from the grass-seeding attachment above the said spouts 31. The spouts 31 are suitably connected with the outer ends of the auger-casings, substantially in the manner seen in Figs. 1 and 2, by inserting the lower ends of the said spouts in openings 32, formed in bosses 33 of the walls of the sections 4 of the casings 2. The point of connecting the lower ends of the spouts with the auger-casings and the angles at which the said spouts are carried insures any grass-seed passing through the spouts from the grass-seeding attachment to be discharged through the discharge-openings 11 of the auger-casings, together with any grain which may be passed through the said auger-casings and thence onto fan-distributers, to be described.

To regulate the quantity of grass-seed which may be discharged from the grass-seeding attachment into the spouts 31, I provide the slide-valves 34, which are adapted to be fixed in adjusted positions by means of the bolts 35 and the winged nuts 36, the bolts adapted to pass through bosses or ears 37 and thence through slots in the valve-plates 34, as shown in Fig. 1. Extending up from and attached to the hopper-support 27 of the grass-seeding attachment is a hopper 38, in which the grass-seed is adapted to be placed.

Extending longitudinally of the end-gate is a driving-shaft 39, journaled in bearings 40, forming a part or attached to a bracket 41, being preferably secured to the end-gate 1. This driving-shaft 39, when the end-gate has been secured to a wagon and the machine is in working position, is adapted to receive its power from one of the ground-wheels of the wagon. The usual mode of operating the driving-shaft of a device of this kind from a wagon is through the agency of a sprocket-wheel attached to the ground-wheels of a wagon, which is connected with a sprocket-pinion on the driving-shaft 39 through a suitable sprocket-chain, the sprocket-pinion of the driving-shaft being connected with clutch mechanism to adapt the same to be intermittently connected and disconnected with the said driving-shaft. These particular devices have not been shown, nor is it thought necessary to illustrate the same, as such devices are well known in the art and to those versed in this class of devices.

42 denotes distributing-shafts which are preferably disposed in a vertical position, the same passing through short vertical bearings 43, attached to or forming a part of the outer ends of the sections 3 of the auger-casings 2, as shown in the majority of the figures, and particularly Figs. 1 and 7. These distributing-shafts also pass through the feedways which have been referred to and which will be described, and on the lower ends of the said distributing-shafts are carried the distributing-fans 44, as shown. I have shown one form of fans. However, it is to be understood that any suitable distributing-fan designed to accomplish the results herein aimed at may be attached or secured to the said distributing-shafts. To the upper ends of the distributing-shafts 42 and above the auger-casings 2 are secured the driven pinions 45, which may be bevel-pinions made of fiber, rubber, cast-iron, or other suitable material and which are designed to mesh with bevel-gears 46, carried on the driving-shaft 39, as shown in Fig. 1. While I may prefer to use bevel-gears and bevel-pinions for imparting motion from the driving-shaft 39 to the distributing-shafts 42, yet it is to be understood that friction-gears and pinions may be substituted therefor. The upper ends of the distributing-shaft, as shown, are journaled in bearings 47, which may be attached to or form part of the brackets 41, as shown.

The driving-shaft 39 not only serves to transmit motion to the distributing-shafts 42, but also operates the auger-shafts 8, the agitating-shaft 22, and the shaft 29, connected with the grass-seeding devices.

Figures 2, 4, 5:
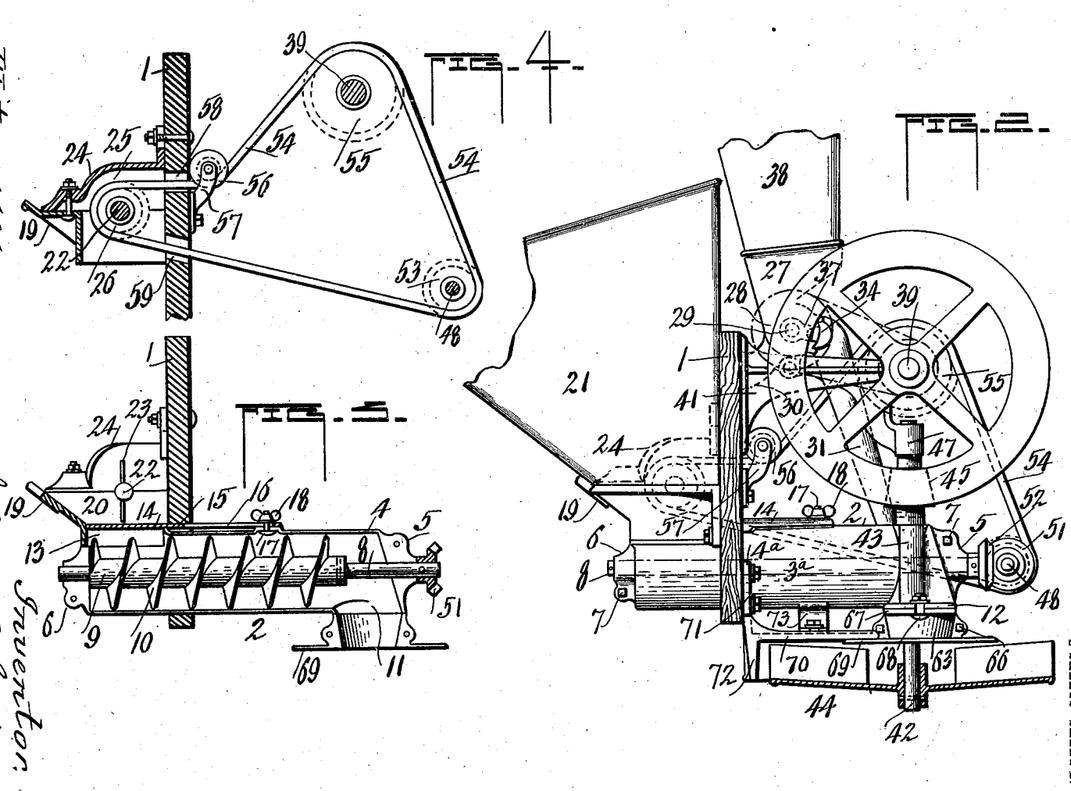
Fig. 4 is a vertical sectional detail of a portion of the end-gate and also showing an agitating-shaft arranged in the hopper-support above the inner end of the auger feed and showing the manner of operating the said shaft.

48 denotes a shaft extending longitudinally of the end-gate, and its opposite ends are journaled in bearings 49, which are connected with or form a part of arms 50, extending out from the rearward ends of the sections 4 of the auger-casings 2. (Best seen in Fig. 6.) On the opposite ends of the shaft 48 are secured miter-gears 51, which mesh with miter-gears 52 on the outer ends of the auger-shafts 8. Such gears are best seen in Figs. 1 and 2 and are omitted in Fig. 6. On the shaft 48 (see Fig. 1) is secured a sprocket-pinion 53, which is engaged by a sprocket-chain 54. This sprocket-chain is driven by a sprocket-wheel 55 on the shaft 39, and the sprocket-chain 54, which is driven therefrom, passes around an idler 56, journaled in a bracket 57, secured to the end-gate 1, and the said chain from the idler passes through a slotted opening 58 n the end-gate 1 and engages with the sprocket-pinion 26 on the agitating-shaft 22. (See Fig. 4.) From the sprocket-pinion 26 the sprocket-chain passes through another slotted opening 59 in the end-gate 1 and engages and operates the sprocket-pinion 53 on the shaft 48, as described. There is also carried by the shaft 39 a sprocket-pinion 60, which is adapted to actuate the grass-seed-distributing shaft 29 through the agency of a sprocket-chain 61, which passes around a sprocket-wheel 62 on the shaft 29. (Best seen in Fig. 1.)

A feature of the drive between the shaft 39 and the shafts 48 and 22 and between the shaft 39 and the shaft 29 is this: The user of the machine may wish to cut out the grass-seed attachment. If so, all he need do is to allow the pinion 60 to run loose on the shaft 39, or, should he desire to only use the grass-seeding devices, all he need do is to allow the wheel 55 to run loose on the shaft 39, the wheel 55 and pinion 60 being fixed to rotate with the shaft 39 by means of set-screws, which may be easily manipulated to fix the gear and pinion with the shaft 39 or allow them to run loose on the shaft, in which case they are inoperative so far as transmitting any power.

The feedways which have been referred to are indicated as 63 and consists of the sections 64 and 65, which are bolted together at 66, as shown, and adjustably secured to the flanges 12 of the auger-casings 2 through the flanges 67 of the feedway 63 and the bolts 68. A portion of the wall of the sections 65 is beveled, as shown in Fig. 7, to cause the grain and grass-seed to be properly discharged on the fan-distributers, which are located beneath the feedways in the manner shown, and a portion of the wall of the section 64 of the feedway is straight to enable the passing of the distributing-shafts 42 therethrough, as shown in Fig. 7. The sections of the feedway are provided with semicircular flanges 69, which unite to form a circular flange, and the same overlies the central portion of the distributing-fans, as shown in the figures. This construction insures the grain and grass-seed being properly distributed onto the fans and prevents its rising until the seed is well on its way to the outer ends of the wings of said fan, from which it is discharged. I have described the feedways as being adjustably secured to the auger-casings. This I accomplish by slotting the flanges 12 and 67 of the auger-casings and feedways, which is best seen in Figs. 6 and 7. The feedways do not require a very wide range of adjustment, as it is intended when the machines are first assembled that all of the parts will be properly adjusted; but it occurs that the castings will sometimes vary in machines of this character and it is then necessary to provide for some adjustment of parts, such as the feedways, which serve to control the discharge of the grain and grass-seed onto the fans.

Coöperating with the feedways and the flanges thereof which overlie the central portions of the distributing-fans is a shield 70, preferably of the shape shown in Fig. 6, having ears 71 for fixedly attaching the same to the end-gate, and the cylindrical casings 2 are supported from and connected to the shield by means of the foot-pieces 73, (best seen in Figs. 2 and 6,) which extend down from the casings. The shield 70 overlies a portion of the fans, as shown in Fig. 6, and depending from the rear portion of the shield is a flange 72, which partially surrounds the said fans, the object of said shield and flange acting as a guard for the said fans and flange and insures the proper delivery of the grain from the said fans.

Having thus fully described my invention, what I claim, and desire to secure by Letters Patent of the United States, is—

1. In a device of the character described, the combination of a removable end-gate for vehicles, an auger supported by and having its feeding portion extending through the end-gate, adapted to receive material upon one side of said end-gate and discharge it from the opposite side thereof, and a distributer disposed beneath the discharge end of said auger.

2. In a device of the character described, the combination of a removable end-gate for vehicles, a pair of augers supported by and having their feeding portions extending through the end-gate, adapted to receive material upon one side of the said end-gate and discharge it from the opposite side thereof, and distributers disposed beneath the discharge ends of said augers.

3. In a device of the character described, the combination of a removable end-gate for vehicles, an auger supported by and having its feeding portion extending through the end-gate, provided with a valved inlet-opening on one side of the said end-gate and a discharge-opening upon the opposite side thereof, and a distributer disposed below the discharge end of said auger.

4. In a device of the character described, the combination of a removable end-gate for vehicles, a pair of augers supported by and having their feeding portions extending through the end-gate, each of which are provided with valved inlet-openings on one side of said end-gate and with discharge-openings upon the opposite side thereof, and a distributer disposed beneath the discharge end of each of said augers.

5. In a device of the character described, the combination of a removable end-gate for vehicles, a casing supported by and extending through the end-gate provided with an inlet-opening at one end and a discharge-opening at the opposite end, an auger mounted in said casing, and a distributer disposed below the discharge-opening in said casing.

6. In a device of the character described, the combination of a removable end-gate for vehicles, a pair of spaced casings supported by and extending through the end-gate, each of which have corresponding inlet-openings upon one side of the end-gate and discharge-openings upon opposite sides thereof, augers mounted in said casings, and distributers disposed below the discharge-openings of each of said casings.

7. In a device of the character described, the combination of a removable end-gate for vehicles, a casing supported by and extending through the end-gate, and having an inlet-opening on one side of the end-gate and discharge-opening upon the opposite side thereof, a valve controlling the inlet-opening in said casing, and a distributer disposed below the discharge-opening thereof.

8. In a device of the character described, the combination of a removable end-gate for vehicles, a pair of spaced casings supported by and extending through said end-gate and having inlet-openings on one side of the end-gate and discharge-openings upon the opposite side thereof, valves controlling the inlet-openings in said casings and distributers disposed below the discharge-openings thereof.

9. In a device of the character described, the combination of a removable end-gate for vehicles, a cylindrical casing supported by and extending through said end-gate provided with an inlet-opening in the upper face of one end thereof and a discharge-opening in the lower face of the opposite end, an auger feed revolubly mounted in said casing, a slide-valve operating through said end-gate and controlling the inlet-opening of the casing, and a distributer mounted below the discharge-opening thereof.

10. In a device of the character described, the combination of a removable end-gate for vehicles, a pair of spaced cylindrical casings supported by and extending through said end-gate provided with inlet-openings in the upper face of one end thereof and discharge-openings in the lower face of the opposite ends, auger feeds revolubly mounted in said casings, slide-valves operating through said end-gate and controlling the inlet-opening of the casings, and distributers mounted below the discharge-openings thereof.

11. In a device of the character described, the combination of an end-gate, a rotary feed extending through the end-gate, adapted to receive material on one side of the end-gate and advancing it through the same discharging it upon the opposite side thereof, a hopper mounted on one side of the end-gate and above the receiving end of the feed, and a distributer mounted upon the opposite side of the end-gate and below the delivery end of the said feed.

12. In a device of the character described, the combination of an end-gate, a casing extending through said end-gate and having an inlet-opening on one side of the end-gate and a discharge-opening upon the opposite side thereof, a revoluble feed member mounted in the casing and adapted to convey material emptied into the receiving end of the casing to and through the discharge-opening therein, a hopper mounted upon one side of the end-gate and above the receiving end of the casing, and a distributer mounted upon the opposite side of the end-gate and below the discharge-opening in said casing.

13. In a device of the character described, the combination of an end-gate, rotary feeding devices supported by and operating through said end-gate and having inlet-openings on one side of the end-gate and discharge-openings upon the opposite side thereof, a hopper supported by the end-gate above the inlet-openings of the rotary feeding devices, and distributing-fans revolubly mounted beneath the discharge-openings of said rotary feeding devices.

14. In a device of the character described, the combination of an end-gate, rotary feeding devices supported by and operating through said end-gate and having inlet-openings on one side of the end-gate and discharge-openings upon the opposite side thereof, a hopper supported by the end-gate above the inlet-openings of the rotary feeding devices, an agitating-shaft revolubly mounted in the hopper and above the inlet-openings aforesaid, and distributer-fans revolubly mounted beneath the discharge-openings of said rotary feeding devices.

15. In a device of the character described, the combination of an end-gate, rotary feeding devices supported by and operating through said end-gate, and having inlet-openings on one side of the end-gate and discharge-openings upon the opposite side thereof, slide-valves controlling said inlet-openings, a hopper supported by the end-gate above the inlet-openings of the rotary feeding devices, an agitating-shaft revolubly mounted in the hopper and above the inlet-openings aforesaid, and distributing-fans revolubly mounted beneath the discharge-openings of said rotary feeding devices.

16. In a device of the character described, the combination of an end-gate, rotary feeding devices supported by and operating through said end-gate and having inlet-openings on one side of the end-gate and discharge-openings upon the opposite side thereof, a hopper supported by the end-gate above the inlet-openings of the rotary feeding devices, a driving-shaft, and means for operating said revoluble feeding devices and fan-distributers from said driving-shaft.

17. In a device of the character described, the combination of an end-gate, rotary feeding devices supported by and operating through said end-gate and having inlet-openings on one side of the end-gate and discharge-openings upon the opposite side thereof, a hopper supported by the end-gate above the inlet-openings of the rotary feeding devices, an agitating-shaft revolubly mounted in the hopper and above the inlet-openings aforesaid, a driving-shaft and means for operating the revoluble feeding devices, the agitating-shaft, and fan-distributers from said driving-shaft.

18. In a device of the character described, the combination of an end-gate, rotary feeding devices supported by and operating through said end-gate, and having inlet-openings on one side of the end-gate and discharge-openings upon the opposite side thereof, slide-valves controlling said inlet-openings, a hopper supported by the end-gate above the inlet-openings of the rotary feeding devices, an agitating-shaft revolubly mounted in the hopper and above the inlet-openings aforesaid, a driving-shaft, and means for operating the revoluble feeding devices, the agitating-shaft and fan-distributers from said driving-shaft.

19. In a device of the character described, the combination of an end-gate, fan-distributers revolubly mounted on one side of the end-gate, mechanism for actuating said distributers mounted on the corresponding side of said end-gate, a grain-containing hopper mounted upon the opposite side of said end-gate, and means for conveying the grain from the hopper through the end-gate to and upon the said fans.

20. In a device of the character described, the combination of an end-gate, fan-distributers revolubly mounted upon one side of said end-gate, grass-seeding devices mounted upon the corresponding side of said end-gate, means for conveying grass-seed from the grass-seeding devices to said fans, a grain-containing hopper mounted upon the opposite side of said end-gate, and means for conveying grain from the hopper through the end-gate to and upon the said fans.

21. In a device of the character described, the combination of an end-gate, distributing-fans revolubly mounted upon one side of said end-gate, grass-seeding devices mounted upon the corresponding side of said end-gate, means for conveying grass-seed therefrom to said fans, a grain-containing hopper mounted upon the opposite side of said end-gate, means for feeding the grain from the hopper through the board to and upon said fans, and driving mechanism mounted upon the corresponding side of the board with the fans and grass-seeding devices and adapted to actuate said grass-seeding devices, fans, and grain-feeding means.

22. In a device of the character described, the combination of an end-gate, fan-distributers revolubly mounted on one side of the end-gate, mechanism for actuating said distributers mounted on the corresponding side of said end-gate, a grain-containing hopper mounted upon the opposite side of said end-gate, an agitating-shaft revolubly mounted in said hopper, means for conveying the grain from the hopper through the end-gate to and upon the fans, and means operated by the distributer-actuating mechanism for actuating the said agitating-shaft.

23. In a device of the character described, the combination of an end-gate, fan-distributers revolubly mounted on one side of the end-gate, mechanism for actuating said distributers mounted on the corresponding side of said end-gate, a grain-containing hopper mounted upon the opposite side of said end-gate, and auger feeding means for conveying grain from the hopper through the end-gate to and upon the fans.

24. In a device of the character described, the combination of an end-gate, fan-distributers revolubly mounted on one side of the end-gate, mechanism for actuating said distributers mounted on the corresponding side of said end-gate, a grain-containing hopper mounted upon the opposite side of said end-gate, auger feeding means for conveying grain from the hopper through the end-gate to and upon the fans, and means operated by said distributer-actuating mechanism for actuating the said augers.

25. In a device of the character described, the combination of an end-gate, fan-distributers revolubly mounted on one side of the end-gate, mechanism for actuating said distributers mounted on the corresponding side of the said end-gate, a grain-containing hopper mounted upon the opposite side of said end-gate, and auger feeding means having their receiving ends below the hopper and passing through the board having their discharge ends above the fans, adapted to convey the grain from the hopper to and upon the fans.

26. In a device of the character described, the combination of an end-gate, fan-distributers revolubly mounted on one side of the end-gate, mechanism for actuating said distributers mounted on the corresponding side of the said end-gate, a grain-containing hopper mounted upon the opposite side of the said end-gate, auger feeding means having their receiving ends below the hopper and passing through the board having their discharge ends above the fans, adapted to convey the grain from the hopper to and upon the fans, and means for operating the said auger feeding means from said fan-actuating mechanism.

27. In a device of the character described, the combination of an end-gate, fan-distributers revolubly mounted on one side of the end-gate, mechanism for actuating said distributers mounted on the corresponding side of said end-gate, a grain-containing hopper mounted upon the opposite side of the said end-gate, casings extending from beneath the hopper on one side of the board to a point above the fans on the other side of said board, augers revolubly mounted in said casings, and means operated by the fan-actuating mechanism for actuating the said augers.

28. In a device of the character described, the combination of an end-gate, fan-distributers revolubly mounted on one side of the end-gate, mechanism for actuating the said distributers mounted on the corresponding side of said end-gate, a grain-containing hopper mounted upon the opposite side of said end-gate, casings extending from beneath the hopper on one side of the board to a point above the fans on the other side of the said board, valve mechanism for controlling the inlet of grain from the hopper to said casings, and means operated by the fan-actuating mechanism for actuating the said augers.

29. In a device of the character described, the combination of an end-gate, fan-distributers revolubly mounted on one side of said end-gate, a hopper mounted on the opposite side of the end-gate casings extending from beneath the hopper on one side of the board to a point above the fans on the other side of said board, augers revolubly mounted in said casings, grass-seeding mechanism mounted on the corresponding side of the board with said distributers, and diverging spouts leading from the grass-seeding devices to the ends of the casings above said fans.

30. In a device of the character described, the combination of an end-gate, fan-distributers revolubly mounted on one side of said end-gate, a hopper mounted on the opposite side of the end-gate, casings extending from beneath the hopper on one side of the board to a point above the fans on the other side of said board, valve mechanism for controlling the inlet of material from the hopper to the casings therebeneath, augers revolubly mounted in said casings, grass-seeding mechanism mounted on the corresponding side of the board with said distributers, and diverging spouts leading from the grass-seeding devices to the ends of the casings above said fans.

31. In a device of the character described, the combination of an end-gate, fan-distributers revolubly mounted on one side of said end-gate, a hopper mounted on the opposite side of said end-gate, an agitating-shaft revolubly mounted in the hopper, revoluble feeding members extending through the end-gate and having their receiving ends beneath the hopper and their discharge ends above the distributers, a driving-shaft mounted on the corresponding side of the end-gate with the distributers, means connected with said driving-shaft for actuating the revoluble feeding members, fan-distributers and agitating-shaft, the means for actuating the agitating-shaft operating through openings in the end-gate.

32. In a device of the character described, the combination of an end-gate, fan-distributers revolubly mounted on one side of said end-gate, a hopper mounted on the opposite side of the end-gate, an agitating-shaft revolubly mounted in the hopper, revoluble feeding members extending through the end-gate and having their receiving ends beneath the hopper and their discharge ends above the fans, a driving-shaft, connections between the driving-shaft and the fan-distributers, and chain belting for operating the revoluble feeding members and agitating-shaft, said chain belting operating through openings in the end-gate.

33. In a device of the character described, the combination of an end-gate, a fan revolubly mounted on one side of the end-gate, a hopper mounted on the opposite side of said end-gate, a revoluble feeding member extending through the end-gate having its receiving end beneath the hopper, and its discharge end above the distributer, and a feedway overlying a portion of the fan and depending from the discharge end of the revoluble member.

34. In a device of the character described, the combination of an end-gate, a fan revolubly mounted on one side of said end-gate, a hopper mounted on the opposite side thereof, a casing extending through the end-gate having its receiving end below the hopper and its discharge end above the distributer, a feeding member revolubly mounted in the casing, and a feedway overlying the said fan, and depending from said casing.

35. In a device of the character described, the combination of an end-gate, a fan revolubly mounted on one side of said end-gate, a hopper mounted on the opposite side thereof, a casing extending through the end-gate having its receiving end below the hopper and its discharge end above the distributer, a feeding member revolubly mounted in the casing, and a feedway overlying the fan and adjustably connected with the discharge end of the casing.

36. In a device of the character described, the combination of an end-gate, a fan revolubly mounted on one side of said end-gate, a hopper mounted on the opposite side of the end-gate, a casing extending through the end-gate having its receiving end below the hopper and its discharge end above the fan, a feeding member revolubly mounted in the said casing, and a feedway depending from said casing above the central portion of the fan and provided with tapered walls.

37. In a device of the character described, the combination of an end-gate, a fan revolubly mounted on one side of said end-gate, a hopper mounted on the opposite side of the end-gate, a casing extending through the end-gate having its receiving end below the hopper and its discharge end above the fan, a feeding member revolubly mounted in the said casing, and a feedway depending from and adjustably connected with the discharge end of said casing and provided with tapered walls.

38. In a device of the character described, the combination of an end-gate, a fan revolubly mounted on one side of said end-gate, a hopper mounted on the opposite side of the end-gate, a casing extending through the end-gate having its receiving end beneath the hopper and its discharge end above the fan, a feeding member revolubly mounted in the casing, a slide-valve controlling the inlet of material from the hopper to the casing, and a feedway depending from the discharge end of the casing and overlying the fan.

39. In a device of the character described, the combination of an end-gate, a fan-distributer revolubly mounted on one side of said end-gate, a hopper mounted upon the opposite side of the end-gate, an agitating-shaft revolubly mounted in the hopper, a casing extending through the end-gate having its receiving end below the hopper and its discharge end above the fan, a feeding member revolubly mounted in the casing, and a feedway depending from the discharge end of the casing and overlying the fan.

40. In a device of the character described, the combination of an end-gate, a fan-distributer revolubly mounted on one side of the end-gate, a hopper mounted upon the opposite side of said end-gate, an agitating-shaft revolubly mounted in the hopper, a casing extending through the end-gate having its receiving end below the hopper and its discharge end above the fan, a feeding member revolubly mounted in the casing, a slide-valve controlling the inlet of material from the hopper into the casing, and a feedway depending from the discharge end of the casing and overlying the fan.

41. In a device of the character described, the combination of an end-gate, a distributer-fan revolubly mounted upon one side of said end-gate, a hopper mounted upon the opposite side thereof, a casing extending through the end-gate having its receiving end below the hopper and its discharge end above the fan, a feeding member revolubly mounted in the casing, a distributing-shaft for said fan, passing through a bearing formed on the discharge end of the casing, and mechanism for actuating said distributing-shaft and also said revoluble feeding member.

42. In a device of the character described, the combination of an end-gate, a pair of distributing-fans revolubly mounted upon one side of said end-gate, a hopper mounted upon the opposite side thereof, a pair of casings extending through the end-gate having their receiving ends below the hopper and their discharge ends above the fans, feeding members mounted in the said casing, and a shield connected with said end-gate and also the said casings and partially overlying and surrounding portions of the said fans.

43. In a device of the character described, the combination of an end-gate, a pair of distributing-fans revolubly mounted on one side of said end-gate, a hopper mounted upon the opposite side thereof, a pair of casings extending through the end-gate having their receiving ends below the hopper and their receiving ends above the fans, feeding members revolubly mounted in the casings, an agitating-shaft revolubly mounted in said hopper and a shield connected with said end-gate and also the said casings, and partially overlying and surrounding portions of the said fans.

44. In a device of the character described, the combination of an end-gate, a pair of distributing-fans revolubly mounted on one side of said end-gate, a hopper mounted upon the opposite side thereof, a pair of casings extending through the end-gate having their receiving ends below the hopper and their receiving ends above the fans, feeding members revolubly mounted in the casings, slide-valves operating through the end-gate for controlling the inlet of material from the hopper to the receiving ends of the casings, an agitating-shaft revolubly mounted in said hopper and a shield connected with said end-gate and also the said casings, and partially overlying and surrounding portions of the said fans.

45. In a device of the character described, the combination of an end-gate, a pair of fan-distributers revolubly mounted on one side of said end-gate, a hopper mounted on the opposite side thereof, a pair of casings extending through the end-gate having their receiving ends below the hopper and their discharge ends above the fans, feeding members revolubly mounted in said casings, depending feeding-ways secured to the discharge end of the casings and overlying said fans, and a shield connected with said end-gate and also the said casings, and partially overlying and surrounding portions of the said fans.

46. In a device of the character described, the combination of an end-gate, a pair of fan-distributers revolubly mounted on one side of said end-gate, a hopper mounted upon the opposite side thereof, a pair of casings extending through the end-gate, having their receiving ends below the hopper and their discharge ends above the fans, slide-valves operating through the end-gate for controlling the inlet of material from the hopper to the receiving ends of the casings, an agitating-shaft mounted in said hopper above the receiving ends of the casings, feedways depending from and secured to the discharge ends of the casings and overlying said fans, and a shield connected with said end-gate and also the said casings, and partially overlying and surrounding portions of the said fans.

47. In a device of the character described, the combination of an end-gate, a fan-distributer revolubly mounted on one side of said end-gate, a hopper mounted upon the opposite side thereof, a cylindrical casing extending through the end-gate having its receiving end below the hopper and its discharge end above the fan, a shaft extending longitudinally through said casing, an auger attached to said shaft within the casing, means for operating said fan, and means for operating said auger-shaft.

48. In a device of the character described, the combination of an end-gate, a fan-distributer revolubly mounted on one side of said end-gate, a hopper mounted upon the opposite side thereof, a cylindrical casing extending through the end-gate having its receiving end below the hopper and its discharge end above the fan, a shaft extending longitudinally through said casing, an auger attached to said shaft within the casing, an agitating-shaft revolubly mounted in said hopper, and mechanism for actuating said auger-shaft, distributer, and agitating-shaft.

49. In a device of the character described, the combination of an end-gate, a fan-distributer revolubly mounted on one side of said end-gate, a hopper mounted upon the opposite side thereof, a cylindrical casing extending through the end-gate having its receiving end below the hopper and its discharge end above the fan, a shaft extending longitudinally through said casing, an auger attached to said shaft within the casing, an agitating-shaft revolubly mounted in said hopper, a slide-valve operating through the end-gate for controlling the inlet of material from the hopper to the receiving end of the casing, and mechanism for actuating the said auger-shaft, distributer and agitating-shaft.

50. In a device of the character described, the combination of an end-gate, a fan-distributer revolubly mounted on one side of said end-gate, a hopper mounted upon the opposite side thereof, a cylindrical casing extending through the end-gate having its receiving end below the hopper and its discharge end above the fan, a shaft extending longitudinally through said casing, an auger attached to said shaft within the casing, an agitating-shaft revolubly mounted in said hopper, a slide-valve operating through the end-gate for controlling the inlet of material from the hopper to the receiving end of the casing, a feedway depending from and connected with the discharge end of said casing, and overlying the said fan, and mechanism for acuating the said auger-shaft, distributer and agitating-shaft.

51. In a device of the character described, the combination of an end-gate, a pair of distributing-fans revolubly mounted on one side of said end-gate, a hopper mounted upon the opposite side thereof, a pair of cylindrical casings extending through the end-gate having their receiving ends below the hopper and discharge ends above the fans, and openings formed in the upper walls of said casings near their discharge ends, revoluble feeding members operating in the said casings, a grass-seeding attachment mounted upon the corresponding side of the end-gate with the fan-distributers, and diverging spouts leading from the grass-seeding attachment and communicating with the openings aforesaid in the casings.

52. In a device of the character described, the combination of an end-gate, a pair of distributing-fans revolubly mounted on one side of said end-gate, a hopper mounted upon the opposite side thereof, a pair of cylindrical casings extending through the end-gate having their receiving ends below the hopper and discharge ends above the fans, and openings formed in the upper walls of said casings near their discharge ends, revoluble feeding members operating in the said casings, an agitating-shaft revolubly mounted in the hopper, slide-valves operating through the end-gate for controlling the inlet of material from the hopper to the casings, a grass-seeding attachment mounted upon the corresponding side of the end-gate with the fan-distributers, and diverging spouts leading from the grass-seeding attachment and communicating with the openings aforesaid in the casings.

53. In a device of the character described, the combination of an end-gate, a hopper mounted on one side thereof, a cylindrical casing extending through the end-gate and having its receiving end below the hopper, a revoluble feeding member mounted in said casing, a distributing-shaft passing through the discharge end of said casing, a fan mounted on the lower end of the distributing-shaft below the discharge end of the casing, a driving-shaft, connections between the driving-shaft and distributing-shaft, and means for actuating the feeding member in the casing from said driving-shaft.

54. In a device of the character described, the combination of an end-gate, a hopper mounted on one side thereof, a cylindrical casing extending through the end-gate and having its receiving end below the hopper, a revoluble feeding member mounted in said casing, a slide-valve operating through the end-gate and controlling the inlet of material from the hopper to the casing, a distributing-shaft passing through the discharge end of said casing, a fan mounted on the lower end of the distributing-shaft below the discharge end of the casing, a driving-shaft, connections between the driving-shaft and distributing-shaft, and means for actuating the feeding member in the casing from said driving-shaft.

55. In a device of the character described, the combination of an end-gate, a hopper mounted on one side thereof, a cylindrical casing extending through the end-gate and having its receiving end below the hopper, a revoluble feeding member mounted in said casing, a slide-valve operating through the end-gate and controlling the inlet of material from the hopper to the casing, an agitating-shaft revolubly mounted in said hopper and disposed above the inlet end of said casing, a distributing-shaft passing through the discharge end of said casing, a fan mounted on the lower end of the distributing-shaft below the discharge end of the casing, a driving-shaft, connections between the driving-shaft and distributing-shaft, and means for actuating the feeding member in the casing and the agitating-shaft in the hopper from the said driving-shaft.

56. In a device of the character described, the combination of an end-gate, a hopper mounted on one side thereof, a cylindrical casing extending through the end-gate and having its receiving end below the hopper, a revoluble feeding member mounted in said casing, a feedway connected with and depending from the discharge end of said casing, a distributing-shaft passing through the discharge end of the casing and also the feedway attached thereto, a fan mounted on the lower end of the distributing-shaft below the feedway, a driving-shaft, connections between the driving-shaft and distributing-shaft, and means for actuating the feeding member in the casing from the said driving-shaft.

57. In a device of the character described, the combination of an end-gate, a distributer-fan mounted on one side of said end-gate, a hopper mounted upon the opposite side thereof, a cylindrical casing extending through the end-gate having its receiving end below the hopper and its discharge end above the fan, said casing comprising two semicircular sections suitably connected together and having bearings formed at its opposite ends, a longitudinally-disposed shaft in said casing, feeding means mounted on said shaft, a driving-shaft, and connections between the driving-shaft and the shaft in the casing.

58. In a device of the character described, the combination of an end-gate, a distributing-fan mounted on one side of said end-gate, a hopper mounted upon the opposite side thereof, a cylindrical casing extending through the end-gate having one end below the hopper and its opposite end above the fan, the end of the casing below the hopper provided with a feed-opening and the end of the casing above the hopper provided with a discharge-opening, said casing comprising two semicircular sections suitably connected together and having bearings formed at its opposite ends, a longitudinally-disposed shaft in said casing, feeding means mounted on said shaft, a slide-valve operating above the inlet-opening in the casing and controlling the inlet of material from the hopper to said casing, a feedway depending from the discharge end of the casing, and overlying said fan, a driving-shaft, and connections between the driving-shaft and the shaft in the said casing.

59. In a device of the character described, the combination of an end-gate, a pair of spaced cylindrical casings supported by and extending through the end-gate, having their receiving ends upon one side of the end-gate and their discharge ends upon the opposite side thereof, shafts longitudinally disposed in said casings, feed members attached to said shafts, a transverse shaft, connections between the transverse shaft and said feeding-shafts, a driving-shaft, connections between the driving and transverse shafts, distributing-fans revolubly mounted below the discharge end of said casings, and means for actuating the said fans from the driving-shaft.

60. In a device of the character described, the combination of a removable end-gate for vehicles, an auger supported by and having its feeding portion extending through said end-gate, a fan-distributer rotatably mounted below the discharge end of said auger, and an interposed auger-way supported between the feed and fan distributer.

61. In a device of the character described, the combination of an end-gate, an auger feed supported by and extending through said end-gate, a fan-distributer rotatably mounted below one end of said feed, an interposed feedway between the distributer and auger feed, and means for adjusting the position of said feedway with respect to the axis of said distributer.

62. In a device of the character described, the combination of an end-gate, an auger feed supported by and extending through said end-gate, a fan-distributer mounted below one end of said feed, a drive-shaft, a counter-shaft parallel with the axis of the drive-shaft, connections between the counter-shaft and auger feed, connections between the drive and counter shafts, and means for operating the distributer from the drive-shaft.

63. In a device of the character described, the combination of an end-gate, a pair of spaced auger feeds supported by and extending through said end-gate, a drive-shaft, a counter-shaft having connection at its opposite ends with the auger feeds, distributers beneath the driven end of said augers, connections between the driven and counter shafts, and means for operating said distributers from the drive-shaft.

64. In a device of the character described, the combination of an end-gate, a pair of spaced casings extending through said end-gate, shafts operating in said casings and augers thereon, distributers below the outer and corresponding ends of said casings, a drive-shaft, a counter-shaft, meshing gears on the outer ends of the auger-shafts and opposite ends of the counter-shaft, connections between the driven and counter shafts, and means for operating the distributers from the driving-shaft.

65. In a device of the character described, the combination of an end-gate, a pair of spaced casings extending through said end-gate, feeding members operating in said casings, a hopper supported on one side of the end-gate above one end of the casings, distributers mounted below the opposite ends of said casings, a shield connected with said casings, partially overlying and partially surrounding the said distributers, a drive-shaft, means for operating the said distributers from the drive-shaft, a counter-shaft connected at its opposite ends to the feeding members in the casings, and means for operating the counter-shaft from the driving-shaft.

66. In a device of the character described, the combination of an end-gate, an auger feed supported by and extending through said end-gate, the longer portion of said auger being on the outside of said end-gate, and adapted to receive material in the shorter end thereof, and discharge it from the opposite end, and a distributer disposed beneath the discharge end of said auger.

67. In a device of the character described, the combination of a removable end-gate for vehicles, a casing attached to and projecting through said end-gate, having an inlet-opening at one end and a discharge-opening at its opposite end, a feeding member revolubly mounted in said casing, a fan-distributer mounted below the discharge-opening in said casing, and an interposed feedway supported between the casing and said distributer.

In testimony whereof I affix my signature in presence of two witnesses.

CHARLES P. SESTER.

Witnesses:
 ROBERT N. McCORMICK,
 CHAS. N. LA PORTE.